Figure 2A:
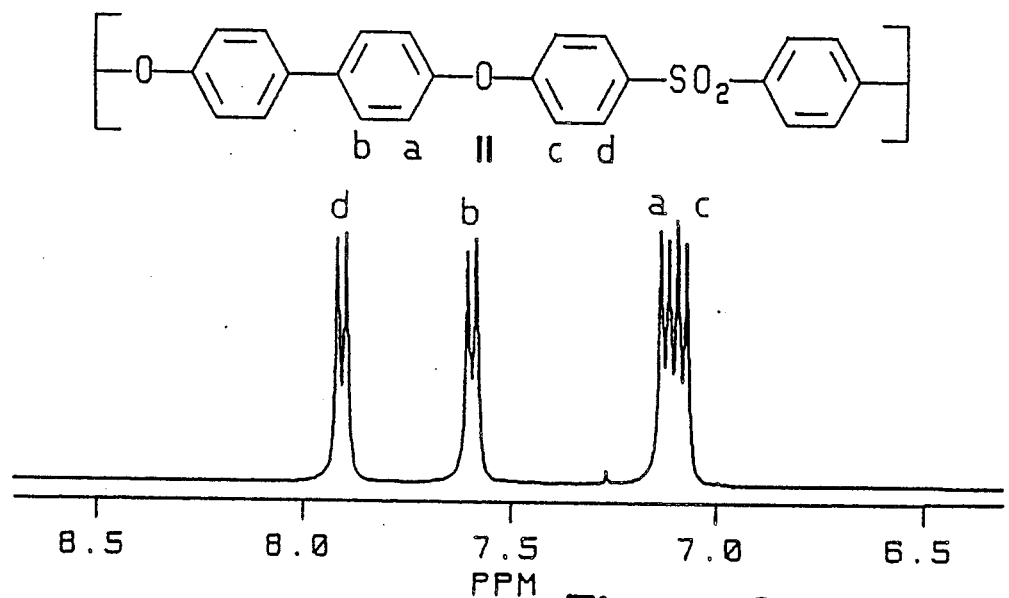

United States Patent [19]

Guiver et al.

[11] Patent Number: 4,996,271

[45] Date of Patent: Feb. 26, 1991

[54] METHOD OF MANUFACTURING HALOGENATED AROMATIC POLYSULFONE COMPOUNDS AND THE COMPOUNDS SO PRODUCED

[75] Inventors: Michael D. Guiver, Ottawa; Oleh Kutowy, North Gower, both of Canada

[73] Assignee: National Research Council of Canada/Conseil de Recherches Canada, Ottawa, Canada

[21] Appl. No.: 281,041

[22] Filed: Dec. 7, 1988

[30] Foreign Application Priority Data

Dec. 11, 1987 [CA] Canada ................................. 554118

[51] Int. Cl.$^5$ ..................... C08C 75/00; C08F 283/00; C08L 81/00
[52] U.S. Cl. ................................... 525/537; 525/534; 528/171; 528/174
[58] Field of Search ................ 525/534, 537; 528/171, 528/174

[56] References Cited

U.S. PATENT DOCUMENTS 4,797,457 1/1989 Guiver et al. ........................ 525/534

Primary Examiner—John Kight, III
Assistant Examiner—P. Hampton Hightower
Attorney, Agent, or Firm—Francis W. Lemon

[57] ABSTRACT

Halogenation of Udel (trademark) and Radel (trademark) polysulfone occurs readily by electrophilic substitution. The reactive substitution position is situated ortho- to the aryl ether linkage in the Bisphenol-A portion of the repeat units. Halogenated polysulfones are obtained by reaction of the polymer with elemental halogen. Thus, a solution of Udel polysulfone in chloroform, treated with excess bromine at room temperature, gives dibrominated polysulfone III in high yield. The degree of substitution after 18-24 hours is typically 1.80 to 2.05 by bromine analysis. Similar results are obtained by reaction of the polymer with elemental chlorine. Lower degrees of substitution are obtained with shorter reaction times or using lesser amounts of halogen.

9 Claims, 2 Drawing Sheets

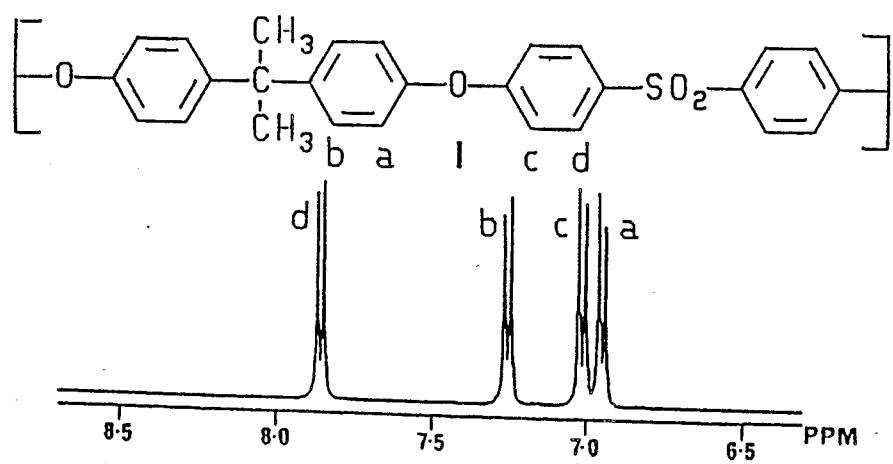
Figure Ib
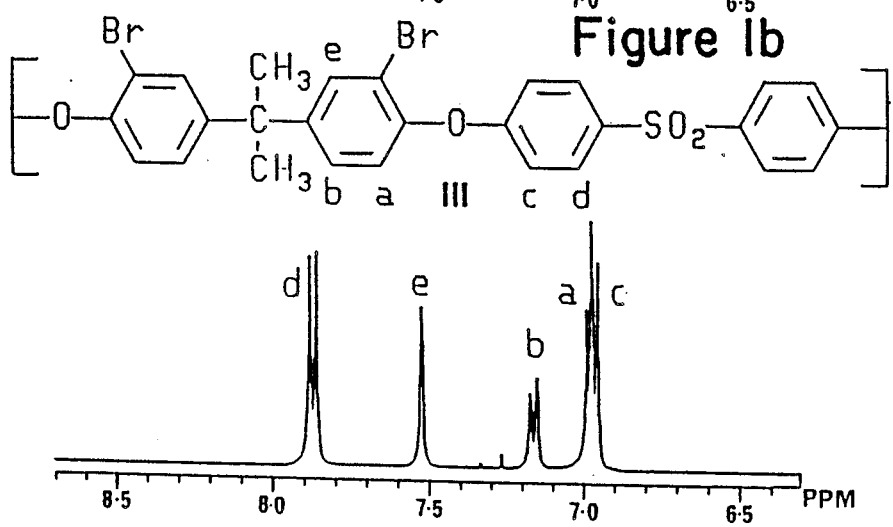
Figure Ia
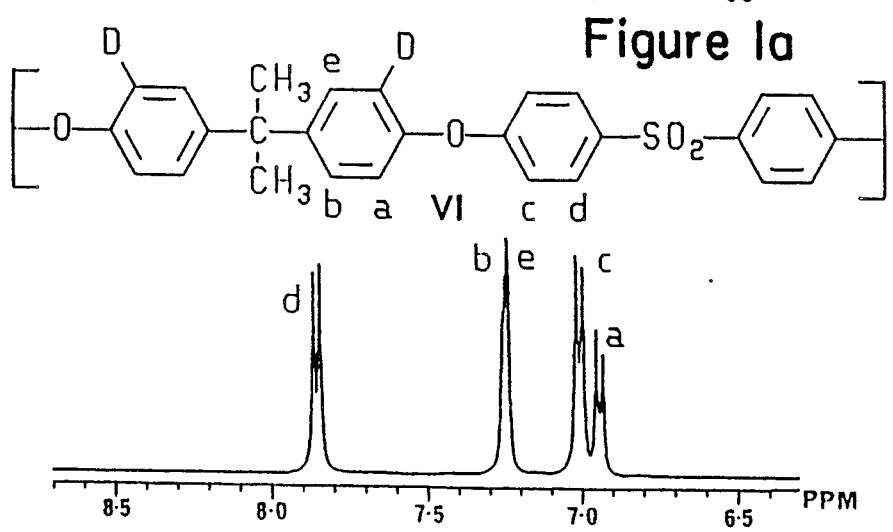
Figure Ic

METHOD OF MANUFACTURING HALOGENATED AROMATIC POLYSULFONE COMPOUNDS AND THE COMPOUNDS SO PRODUCED

This invention relates to method of manufacturing halogenated aromatic polysulfone compounds and the compounds so produced.

More particularly, this invention relates to a method of manufacturing halogenated aromatic polysulfones containing bromine and chlorine groups and the polysulfones so produced.

Polysulfones are high performance thermoplastics which have excellent mechanical properties, thermal and oxidative stability and high glass transition temperatures. A method of manufacturing the polymer starting materials is taught by R. N. Johnson and A. G. Farnham, U.S. Pat. No. 4,108,837 (1978). The introduction of functional groups into these polymers by chemical modification is well known to induce significant changes in physical properties. For example, the sulfonation of polysulfone I (n=1), taught by J. P. Quentin, U.S. Pat. No. 3,709,841 (1973), results in a polymer with increased hydrophilicity and glass transition temperature and which is useful for the fabrication of porous membranes.

It has already been proposed in Japanese Published Patent Application (KOKAI) No. 75 50,325, published May 6, 1975, I. Ohmae and Y. Takeuchi (Chemical Abstract 84: 31968K), to prepare aromatic bromides by catalytic bromination. The process of Ohmae et al, requires the use of an iron catalyst and gives a brittle polymer of high bromine content, useful only as a fire retardent additive.

It would be desirable to introduce halogen atoms into polysulfones by controlled direct halogenation without the need of a catalyst.

Halogenated aromatic polysulfones have already been prepared from halogenated bisphenol monomers by polymerization, see "Poly(aryl Ethers) by Nucleophilic Aromatic Substitution. I. Synthesis and Properties" by R. N. Johnson, A. G. Farnham, R. A. Clendinning, W. F. Hale, and C. N. Merriam, Journal of Polymer Science: Part A-1, Vol. 5, 2375-2398 (1967). While the halogenated aromatic polysulfones of Johnson et al are useful, their method of preparation limits the scope for controlling the degree of halogenation as well as the control of molecular weight. Other halogenated aromatic polysulfones have been prepared from halogenated sulfone monomers by polymerization, see "Chlorine-containing polyether sulfone polymers" by S. Kurosawa and T. Ueshima, U.S. Pat. No. 4,533,721 (1985).

There is a need for a method of manufacturing modified, aromatic polysulfone compounds or derivatives wherein there is greater scope for controlling the degree of halogenation and ease of preparation, thus resulting in products having a wider range of improved or modified chemical or physical properties such as, for example, glass transition temperature, hydrophilicity, hydrophobicity, solubility or chemical reactivity and which are processable into, for example, membranes, sheets, films, fibres or more rigid articles.

In general, the introduction of halogen into polymer imparts the characteristic of fire retardency. Apart from this, halogen atoms in polysulfone are useful in providing reactive sites which may be useful as crosslinking or grafting sites or which may be subjected to further chemical modifications so as to introduce different functional groups.

According to the present invention there is provided a method of manufacturing an aromatic polysulfone compound, comprising, (a) forming a solution of the polysulfone compound with halogenated solvent, the polysulfone compound having at least one repeating unit of the general formula,

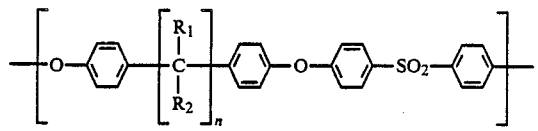

wherein n is one or zero, and when n is one, $R_1$, and $R_2$ each represent alkyl or aryl groups (b) adding sufficient halogen to the solvent to halogenate the polysulfone compound to the desired degree, so as to form a halogenated compound having repeat units of the general formula,

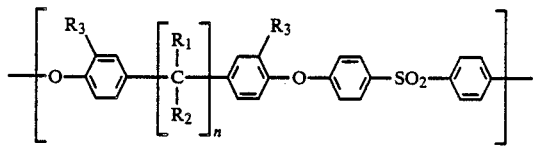

wherein $R_1$, $R_2$ and n are as previously defined and at least one $R_3$ per polymer chain is a halogen substitution of a hydrogen atom, (c) halogenated polysulfone compound from the solvent, and In some embodiments of the present invention bromine is added to the solution so that, at least one $R_3$ per polymer chain is brominated.

In some embodiments of the present invention chlorine is added to the solution so that at least one $R_3$ is chlorinated.

The halogenated polysulfone separated from the solvent by, for example, solvent evaporation therefrom, or precipitation therefrom in a non-solvent liquid for the halogenated polysulfone.

In some embodiments of the present invention $R_1$ and $R_2$ are methyl, n is one and the said at least one $R_3$ is selected from the group consisting of bromine and chlorine.

In other embodiments of the present invention n is zero, and the said at least one $R_3$ is selected from the group consisting of bromine and chlorine.

According to another aspect of the present invention there is provided a halogenated aromatic polysulfone compound, having repeating units of the general formula,

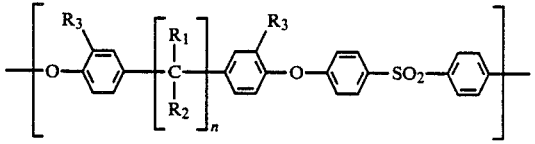

wherein n is one or zero, and when n is one $R_1$ and $R_2$ each represent alkyl or aryl groups, and at least one $R_3$ per polymer chain is a halogen substitution of a hydrogen atom.

In the accompanying figures which illustrate, by way of example, embodiments and uses of the present invention.

Figure 2B:
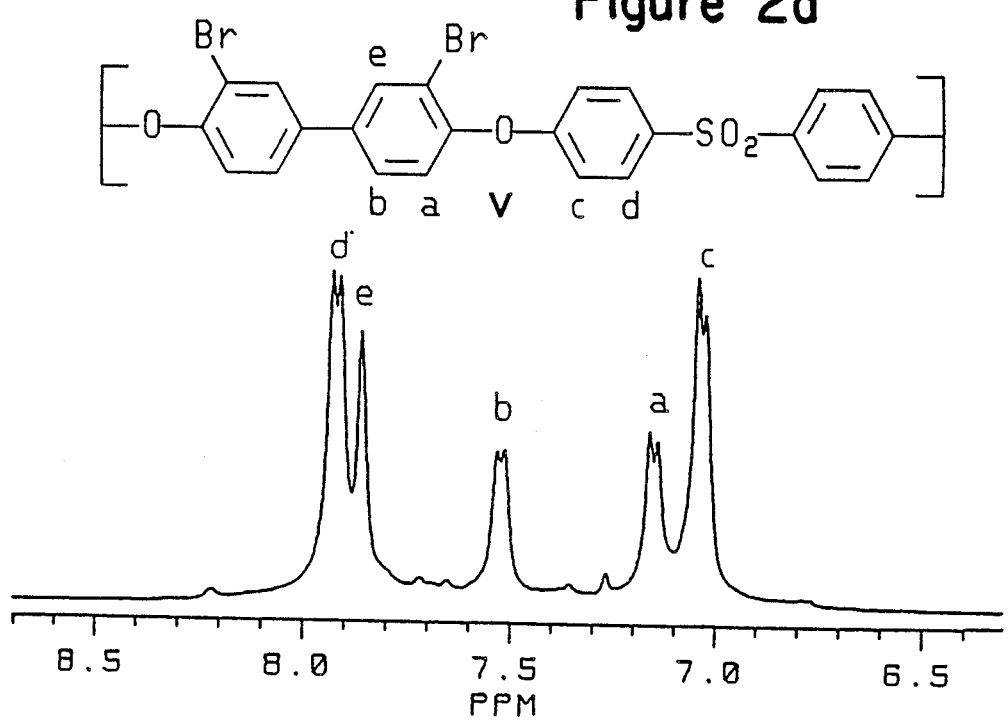

FIGS. 1a and 1b show the NMR spectra (aromatic region) of dibrominated polymer and the FIG. 1c shows the NMR spectrum (aromatic region) of the unmodified Udel polysulfone (trademark) respectively, dideuterated product derived from the dibrominated polymer of FIG. 1a, and FIGS. 2a and 2b show NMR spectra (aromatic region) of unmodified Radel polysulfone (trademark) and dibrominated polymer respectively.

In the following tests to verify the present invention; Udel polysulfone of the formula,

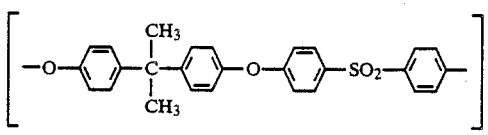

hereinafter referred to as Udel polysulfone I, and Radel polysulfone of the formula

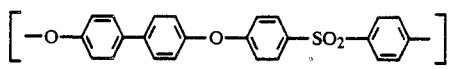

hereinafter referred to as Radel polysulfone II, were used as starting materials for halogenation according to the present invention.

In the following halogenation tests, chloroform was used as the solvent and the tests were carried out at temperatures in the ranges specified. It will be self evident to persons skilled in the art that other halogenated solvents and temperatures will give similar results. Examples of other halogenated solvents are, dichloromethane, dibromomethane and tetrachloromethane. While the tests have shown that halogenation may be carried out at different temperatures, halogenation is adequately and conveniently carried out at room temperature. Polymers containing an average of two halogens per repeat unit are obtained by using a slight excess of halogen. Polymers with lower degrees of substitution of halogen are obtained by using lesser amounts of halogen or shorter reaction times.

TEST I

Bromination of Udel Polysulfone I at room temperature

Bromine (11.0 g, 0.0687 mol) was added to a stirred solution of Udel polysulfone I (11.05 g, 0.025 mol) in chloroform (60 mL) at room temperature under an inert atmosphere in the form of argon gas. White clouds of hydrogen bromide soon began to evolve. The mixture was stirred at room temperature for 24 hours and then precipitated into methanol. The recovered dibrominated Udel polysulfone hereinafter referred to as dibrominated polymer III was left standing in fresh methanol to leach out residual free bromine, and was then filtered and dried in a vacuum oven at 40° C. Yield=15.00 g (100). Intrinsic viscosity [η]=0.28. Dibrominated polymer III had repeat units of the formula

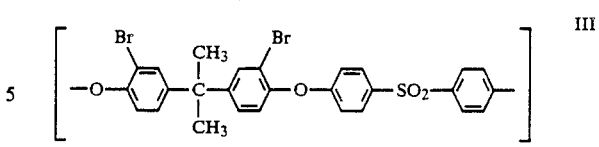

Samples for elemental analysis were prepared by reprecipitation of a filtered chloroform solution of polymer.

Elemental analysis: calculated for $C_{27}H_{20}SO_4Br_2$

|   | Calculated | Found | Found |
|---|---|---|---|
| C | 54.02% | 53.06% | — |
| H | 3.36% | 3.25% | — |
| Br | 26.62 | 27.55% | 27.29% |

NMR 400 MHz (CDCl$_3$): δ=7.87 H-d (4H d. J≈8.8), δ=7.52 H-e (2H d. J≈2.0), δ=7.16 H-b (2H dd. J≈8.3, J≈2.0), δ=6.97 H-a (d. J≈8.3), δ=6.96 H-c (d. J≈8.8), δ=1.69 CMe$_2$ (6H s.).

TEST II

Bromination rate of Udel Polysulfone I

Bromine (11.0 g, 0.0687 mol) was added to a stirred solution of Udel polysulfone I (11.05 g, 0.025 mol) in chloroform (100 mL). Samples of the reaction mixture were withdrawn at 1, 2, 3, 4, 5 and 24 hour intervals and the polymers was recovered and analyzed for bromine.

Elemental analysis:

| Sample/time (hr.) | % C | % H | % Br |
|---|---|---|---|
| 1 | 62.07 | 4.10 | 13.25 |
| 2 | 60.25 | 3.92 | 16.07 |
| 3 | 60.30 | 3.93 | 17.18 |
| 4 | 57.40 | 3.69 | 19.53 |
| 5 | 57.74 | 3.71 | 19.38 |
| 24 | 54.93 | 3.45 | 23.46 |
| $C_{27}H_{20}SO_4Br_2$ | 54.02 | 3.36 | 26.62 |

TEST III

Bromination of Udel Polysulfone I at elevated temperature

Udel polysulfone I (44.2 g, 0.100 mol) was dissolved in chloroform (250 mL) in a 3 necked 500 mL flask equipped with magnetic stirrer, condenser and argon gas inlet. Bromine (44.0 g, 0.275 mol) was added and the reddish mixture was stirred at reflux temperature. Five minutes following the addition, dense white clouds of hydrogen bromide were evolved which continued at a lesser rate for several hours. The mixture was refluxed for 24 hours and then precipitated into methanol, filtered and left to stand in fresh methanol. The analytical sample of the dibrominated polymer III was prepared by precipitation of a filtered polymer solution. Yield=57.2 g (95%). [η]=0.27.

In the following table, the elemental analysis was calculated for $C_{27}H_{20}SO_4Br_2$

|   | Calculated | Found |
|---|---|---|
| C | 54.02% | 57.58% |
| H | 3.36% | 4.17% |
| S | 5.34% | 5.06% |

| | Calculated | Found |
|---|---|---|
| Br | 26.62% | 24.46% |

The dibrominated polymer III produced by the tests I to III was found to be capable of being formed into flexible sheets or films.

TEST IV

The following test was carried out to compare products of the method according to the present invention with that of the Ohmae et al., process.

Bromination of Udel Polysulfone I with Bromine using an Iron Catalyst

Following a similar procedure to Ohmae et al., bromine (7.25 mL, 0.141 mol) was added to a stirred solution of Udel polysulfone I (11.0 g, 0.025 mol) in chloroform (100 mL) containing a suspension of iron filings (20 mg). The mixture was stirred for 1 hour at room temperature and then two hours under reflux. A small sample was extracted and purified for elemental analysis. Stirring under reflux was continued for a total of 20 hours before the polymer was recovered by precipitation into iso-propanol. The product was washed thoroughly with methanol four times and then purified for elemental analysis by reprecipitation of a filtered chloroform solution of the polymer. The polymer thus produced was dried in a vacuum at room temperature and the brittle greyish-brown polymer thus produced was not suitable for casting or molding purposes.

Elemental analysis:

| | 2 hours | 20 hours |
|---|---|---|
| C | 49.88% | 45.85% |
| H | 3.03% | 2.62% |
| S | 6.39% | 5.61% |
| Br | 31.70% | 40.52% |

In contrast to the dibrominated polymer III, the polymer thus produced was brittle and contained slightly less than four bromine atoms per repeat unit as opposed to six produced by Ohmae et al.

TEST V

Chlorination of Udel Polysulfone I

Chlorine gas was bubbled into a solution of Udel polysulfone I (44.2 g, 0.10 mol) in chloroform (250 mL) at 40° C. for 150 minutes. During this time, the evolution of acidic hydrogen chloride gas was shown by moist indicator paper. The polymer product hereinafter designated dichlorinated polymer IV was recovered by precipitation into methanol, washed and then dried at room temperature in a vacuum. A sample for elemental analysis was prepared by reprecipitation of a filtered THF solution of polymer. The dichlorinated polymer IV was brittle and had a low intrinsic viscosity. $[\eta]=0.13$. Dichlorinated polymer IV had repeat units of the formula

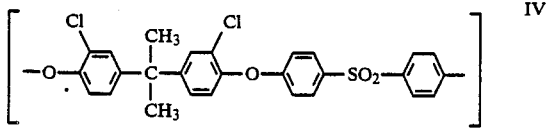

Elemental analysis: calculated for $C_{27}H_{20}SO_4Cl_2$

| | Calculated | Found |
|---|---|---|
| C | 63.41% | 63.57% |
| H | 3.94% | 4.02% |
| S | 6.27% | 6.19% |
| Cl | 13.86% | 14.04% |

NMR 400 MHz (CDCl$_3$): $\delta=7.87$ (4H d.), $\delta=7.36$ (br.s.), $\delta=7.25$ (d.), $\delta=7.13$ (br.d.), $\delta=7.01$ (br.d.), $\delta=6.96$ (d.), $\delta=1.70$ CMe$_2$ (6H s.).

TEST VI

Bromination of Radel Polysulfone II

Bromine (3.0 mL, 0.058 mol) was added to a solution of Radel polysulfone II (4.00 g, 0.01 mol) in chloroform (50 mL). Hydrogen bromide gas evolution began soon after the mixture was brought to reflux temperature. After stirring for 18 hours at reflux the mixture was cooled and a slurry of polymer solution separated out. The supernatant was discarded and the polymer product, hereinafter referred to as dibrominated polymer V was recovered by precipitation into methanol. Excess free bromine was leached out by allowing the polymer to stand in methanol. The dibrominated polymer V was purified for elemental analysis by two reprecipitations of chloroform solutions into methanol and then dried under vacuum. Dibrominated polymer V had repeat units of the formula.

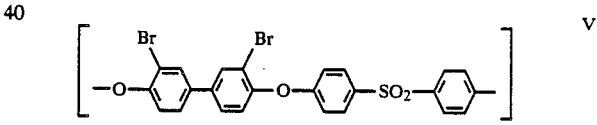

Elemental analysis: calculated for $C_{24}H_{14}SO_4Br_2$

| | Calculated | Found |
|---|---|---|
| C | 51.63% | 51.37% |
| H | 2.53% | 2.68% |
| S | 5.74% | 5.88% |
| Br | 28.63% | 28.86% |

NMR 400 MHz (CDCl$_3$): $\delta=7.91$ H-d (4H d.), $\delta=7.85$ H-e (2H br.s.), $\delta=7.52$ H-b (2H br.d.), $\delta=7.14$ H-a (2H d.), $\delta=7.02$ H-c (4H d.).

Test VII was to confirm the location of bromination as well as to demonstrate the utility of brominated polymer as a reactive intermediate.

TEST VII

Lithiation/Deuteration of Dibrominated Polymer III n-Butyllithium (0.0105 mol, 10.5M) was added dropwise to a stirred solution of dibrominated polymer III (3.00 g, 0.005 mol) in THF (75 mL) at −78° C. The clear red solution was stirred for 30 minutes before a solution of D$_2$O in THF was added. The resulting dideuterated polysulfone, hereinafter referred to as dideuterated polymer VI, solution was precipitated into methanol, washed in methanol and dried under vacuum. [η]=0.47. Dideuterated polymer VI had repeat units of the formula

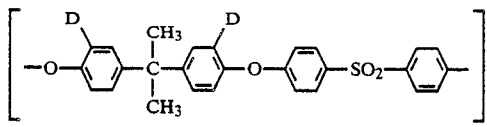
VI

NMR 400 MHz (CDCl₃): δ=7.85 H-d (4H d.), δ=7.24 H-b and H-e (4H m.), d=7.00 H-c (4H d.), δ=6.94 H-a (2H d.), δ=1.69 CMe₂ (6H s.).

TEST VIII

Attempted Bromination of 'Victrex Polysulfone' (trademark), hereinafter referred to as Polysulfone VII Bromine (3.0 mL, 0.058 mol) was added to the polysulfone VII (2.32 g, 0.01 mol) which had been gelled with chloroform (50 mL). The mixture was refluxed for 20 hours and then precipitated into methanol, washed and dried. An NMR (CH₂Cl₂) of the aromatic region revealed unchanged starting material.

This test showed that not all polysulfones are amenable to halogenation according to the present invention, for example polysulfone VII when subjected to bromination according to test VIII resulted, as stated above, in an unchanged starting material of the formula

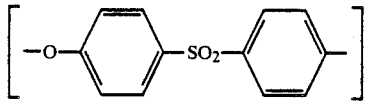
VII

Thus the tests I to VIII have shown that the present invention is surprisingly useful with specific polysulfones selected from a wide range of polysulfones that have been synthesized.

It has already been proposed in U.S. Pat. No. 3,402,144 dated Sept. 17, 1986, "Alkali Metal-Containing Polyphenylene Ethers", A. S. Hay to metalate polyphenylene ethers with alkali metal alkyls or aryls to give alkali metal-containing polyphenylene ethers.

The teachings of Hay would not lead a person skilled in the art to believe that specific polysulfones, from the wide range of polysulfones that have been synthesized, could be halogenated according to the present invention.

Referring now to the drawings, FIG. I shows the 400 MHz NMR spectrum (aromatic region) of dibrominated polymer III (III, FIG. 1) compared with the unmodified polysulfone I (I, FIG. 1). The modification site in the Bisphenol-A portion of the polymer is shown by the largely unchanged downfield aryl-sulfone doublets. Protons ortho- to bromine appear as a meta-coupled doublet at δ=7.52. The unmodified polymer H-b doublet is replaced by a doublet of doublets at δ=7.16 arising from ortho- and meta-coupling in the dibrominated polymer. Although the product had a lower viscosity, little or no degradation appeared to occur since the subsequently metalated/deuterated product VI (VI, FIG. 1) had a similar viscosity to polysulfone I.

The utility of dibrominated polymer III as a reactive polymer was demonstrated by the preparation of a simple dideuterated derivative by metalation. Dibrominated polysulfone III was metalated with n-butyllithium according to test VII and the lithiated intermediate was converted to dideuterated polymer VI by reaction with deuterium oxide. Both the bromine and the ortho-sulfone position are potentially reactive metalation sites; the first by simple metal-halogen exchange and the second by hetero-atom directed lithiation. A substantial amount of competition between these two reactions might be expected. However, the NMR spectrum of the dideuterated polymer VII also shown in FIG. I shows that metal-halogen exchange is the dominant reaction, with a minimal amount of ortho-lithiation evident in this derivative. The aryl sulfone doublets remain unaltered while the Bisphenol-A proton signals show dideuteration ortho- to oxygen by the H-b/h-e multiplet and the diminution of the doublet H-a in the NMR spectrum.

Udel polysulfone I is also reactive to chlorination with elemental chlorine. A dichlorinated polysulfone of the structure IV was obtained, as confirmed by elemental analysis. The NMR spectrum was very similar to the dibrominated polymer III.

Referring now to FIG. 2, the tests show that Radel polysulfone II (II, FIG. 2) is also readily dibrominated by excess elemental bromine in the absence of catalyst. The degree of substitution was two bromine atoms per repeat, unit as shown by bromine analysis. The position of bromination also occurs at the electrophilic site ortho- to the ether linkage and the polymer consists of repeat units of the formula V. The NMR spectrum of dibrominated polymer V, (V, FIG. 2) shows unchanged signals from the aryl-sulfone portion. The three types of protons in the substituted ring appear as a singlet at δ=7.85 (h-e), a broadened doublet at δ=7.52 (H-b) and a doublet at δ=7.14 (H-a), confirming the site of substitution in the biphenyl ring.

It is within the scope of the present invention to form the polysulfone compound to be halogenated into a solution with halogenated solvent, and then halogenate the polysulfone by adding both bromine and chlorine to the solution.

We claim:

1. A method of manufacturing a halogenated aromatic polysulfone compound, comprising:
   (a) forming a solution of the polysulfone compound with halogenated solvent, the polysulfone compound having repeating units of the general formula,

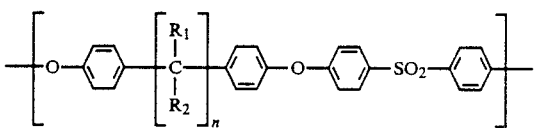

wherein n is one or zero, and when n is one R₁ and R₂ each represent alkyl or aryl groups, (b) adding sufficient halogen to the solvent to halogenate the polysulfone compound to the desired degree so as to form a halogenated compound having repeating units of the general formula,

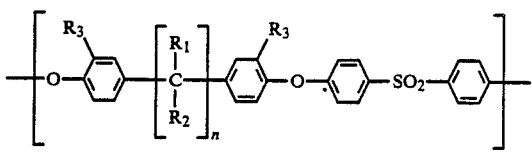

wherein $R_1$, $R_2$ and n are as previously defined and at least one $R_3$ per polymer chain is a halogen substitution of a hydrogen atom, and (c) separating the halogenated polysulfone compound from the solvent.

2. A method according to claim 1, wherein bromine is added to the solution so that at least one $R_3$ per polymer chain is brominated.

3. A method according to claim 1, wherein chlorine is added to the solution so that at least one $R_3$ per polymer chain is chlorinated.

4. A method according to claim 1, wherein the halogenated polysulfone is separated from the solvent by evaporating the solvent.

5. A method according to claim 1, wherein the halogenated polysulfone is separated from the solvent by being precipitated therefrom in a non-solvent liquid for the halogenated polysulfone.

6. A method according to claim 2, wherein $R_1$ and $R_2$ are methyl, n is one.

7. A method according to claim 3, wherein $R_1$ and $R_2$ are methyl, and n is one.

8. A halogenated aromatic polysulfone compound, having repeating units of the general formula,

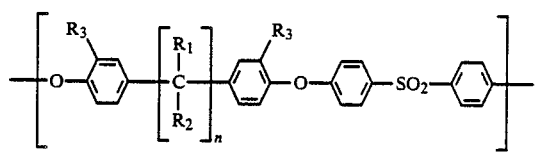

wherein n is one or zero, and when n is one $R_1$ and $R_2$ each represent alkyl or aryl groups, and at least one $R_3$ per polymer chain is a halogen substitution of a hydrogen atom.

9. A compound according to claim 8, wherein $R_1$ and $R_2$ when present are methyl, and the said at least one $R_3$ is selected from the group consisting of bromine and chlorine.

* * * * *